United States Patent [19]
Pulver

[11] 3,994,276
[45] Nov. 30, 1976

[54] METHOD OF SOLAR HEATING SO AS TO REDUCE OIL AND GAS CONSUMPTION

[76] Inventor: Donald W. Pulver, 1616 Trolist Drive, Pittsburgh, Pa. 15241

[22] Filed: Mar. 6, 1975

[21] Appl. No.: 556,054

[52] U.S. Cl. .............................. 126/270; 237/1 A; 165/48; 219/279
[51] Int. Cl.² ............................................ F24J 3/02
[58] Field of Search ............ 126/270, 271; 237/1 A; 165/48, 49; 219/279

[56] References Cited
UNITED STATES PATENTS

| | | | |
|---|---|---|---|
| 2,601,905 | 7/1952 | Anderegg | 126/270 |
| 2,680,565 | 6/1954 | Löf | 126/271 |
| 3,812,903 | 5/1974 | Thomason | 126/400 |
| 3,832,992 | 9/1974 | Trombe | 237/1 A |
| 3,949,732 | 4/1976 | Reines | 126/270 |

FOREIGN PATENTS OR APPLICATIONS

| | | | |
|---|---|---|---|
| 2,021,579 | 11/1971 | Germany | 219/279 |

Primary Examiner—Kenneth W. Sprague
Assistant Examiner—James C. Yueng
Attorney, Agent, or Firm—David H. Semmes

[57] ABSTRACT

Solar heating, especially the use of solar heating to reduce oil and gas consumption in conventional forced air heating systems of the type having supply and return ducts. During daylight hours, solar heated air is circulated as a heating supplement or substitute for furnace heated air in the existing forced air supply ducts. At night the solar heat collecting panel is shut off from the furnace system and electric resistance heated air is circulated to the exclusion of oil and gas consumption. The method is distinguished in its use of solar heat during sunny daylight hours and the use of electric resistance heating at night when existing electric generating and transmission facilities are under utilized.

6 Claims, 8 Drawing Figures

SOUTH
OR
SOUTH EAST
OR
SOUTH WEST

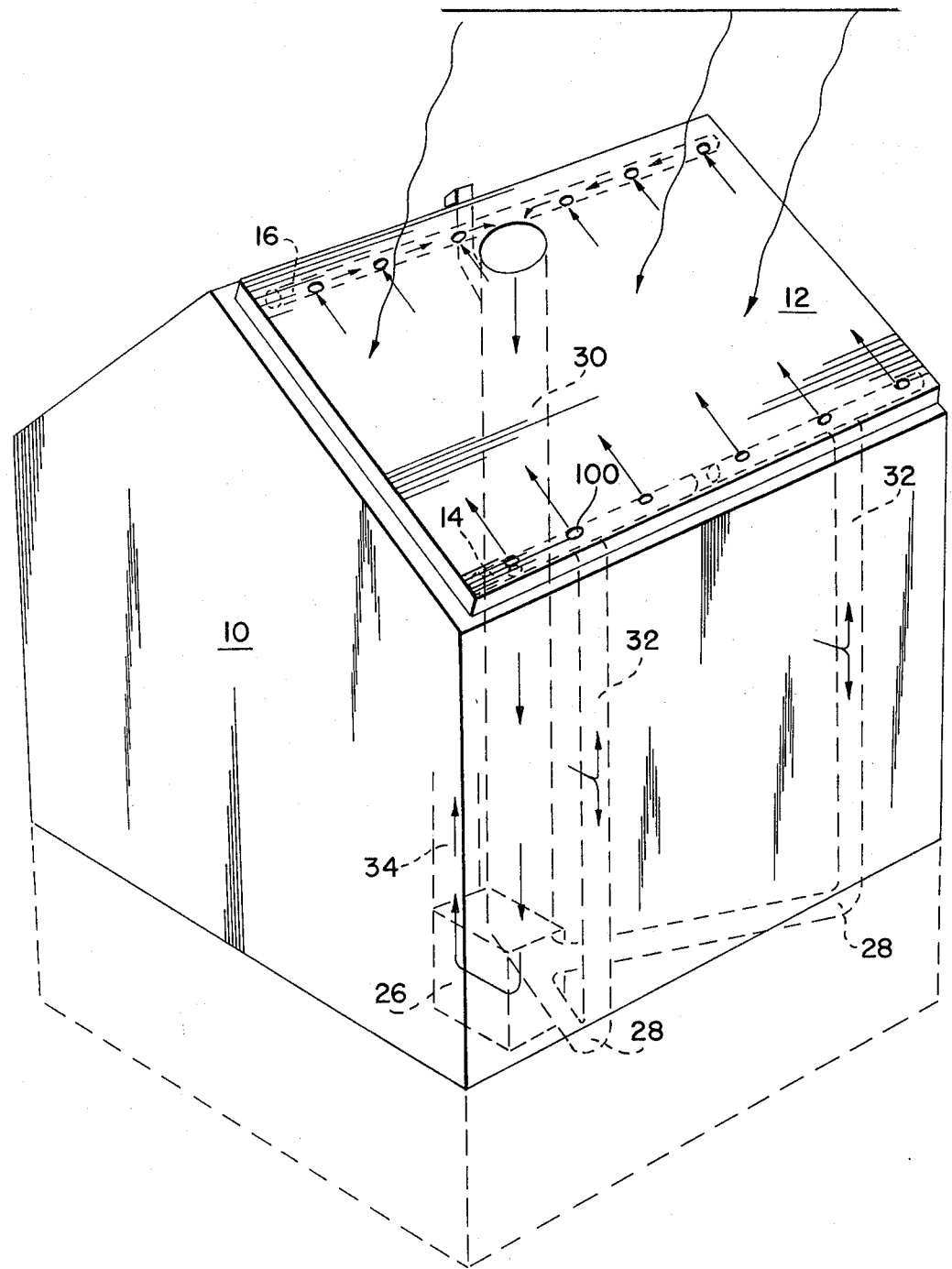

METHOD OF SOLAR HEATING SO AS TO REDUCE OIL AND GAS CONSUMPTION

CROSS-REFERENCES TO RELATED APPLICATIONS

This application deals with advantageously employing solar energy within a structure as does my copending application Ser. No. 453,239, filed Mar. 21, 1974 issued as U.S. Pat. No. 3,935,897.

BACKGROUND OF THE INVENTION

1. Field of the Invention

Solar heating, particularly the employment of solar heating panels as an adjunct to conventional forced air heating systems in a building. In addition, the use of solar heating in combination with electric resistance heating, so as to reduce oil and gas consumption in conventional forced air heating systems.

2. Description of Prior Art

| MAYO | 2,529,621 |
|---|---|
| GAY | 2,559,868, '870, and '871 |
| ANDEREGG | 2,601,905 |
| LOF | 2,680,565 |
| THOMPSON | 3,412,728 |
| TROMBE | 3,832,992 |

The prior art structures suggest circulating of solar heated air, but do not show the combination of circulating solar heated air during daylight hours, and switching to electric resistance heated air at night.

SUMMARY OF THE INVENTION

According to the teachings of the present invention, conventional oil or gas forced air heating systems can be supplemented in the daytime by circulating solar heated air and further supplemented at nighttime by circulating electric resistance heated air. Thus, during daylight hours oil and gas are conserved by the addition of solar heated air and during nighttime hours oil and gas are conserved by circulating of electric resistance heated air at a time when there is low electrical demand. Modifications of invention include limiting circulation of solar heated air, except as the desired temperature is obtained, diverting of electric resistance heated air into specific areas, for example, into bedrooms during nighttime hours.

BRIEF DESCRIPTION OF THE DRAWINGS

FIG. 2 is a similar view (partially in phantom) showing the support of the collection panel in communication with the return and supply ducts of a conventional furnace, forced air heating system;

DESCRIPTION OF THE PREFERRED EMBODIMENTS

Figure 1:
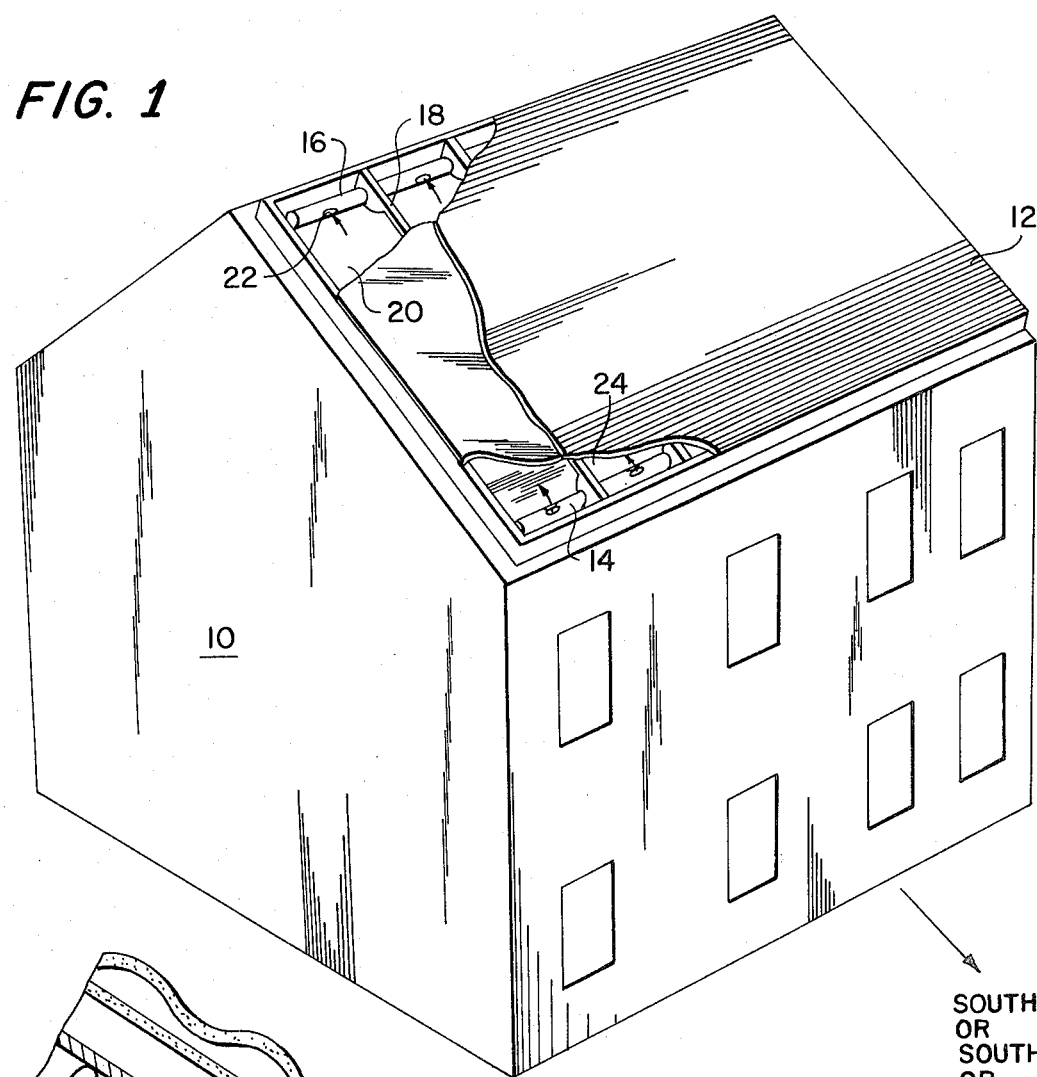
FIG. 1 is a perspective view of a building employing a solar collection panel in its roof.

In FIG. 1 a dwelling 10 is illustrated as supporting in its roof a solar collecting panel generally designated as 12, such that the panel faces south, southeast or southwest. The panel defines with the building roof a solar heated air collection plenum 20 fed at its bottom by means of transverse header supply duct or manifold 14 having holes of varying diameter, such that uniform flow across the transverse surface is achieved. At the plenum top a similar header collector duct or manifold 16 extends through conventional rafters 18 and includes a plurality of varying diameter holes 22. An absorptive foil bottom 24 may be positioned between rafters 18.

In FIG. 2 a conventional forced air furnace 26 is shown as employing peripheral return ducts 28, central return duct 30 and a plurality of supply ducts 34 having vents 36 into the living and sleeping areas.

In FIGS. 3, 4, 6 and 7 the solar collecting panel 12 is further illustrated as including a solar heated air plenum 86 having insulation 84 at its bottom, a corrugated top collector panel 88 and a flat collector panel 90 both advantageously of fiberglass, for defining a separate closed insulating plenum 92.

A solar collector fan 44 may be employed to enhance the removal of solar heated air from the plenum 86 and the delivery of solar heated air into central return duct 30. During summertime, auxiliary vent 40 having damper 42 may be opened such that the solar heated air is advantageously vented exteriorly of the roof surface either by natural convection through the assistance of fan 44, thus further serving to remove an unwanted solar heating loading. Bottom vents 91 and 93 covered during winter by panel 95, hinged as 97, may be provided for this purpose.

Figure 7:
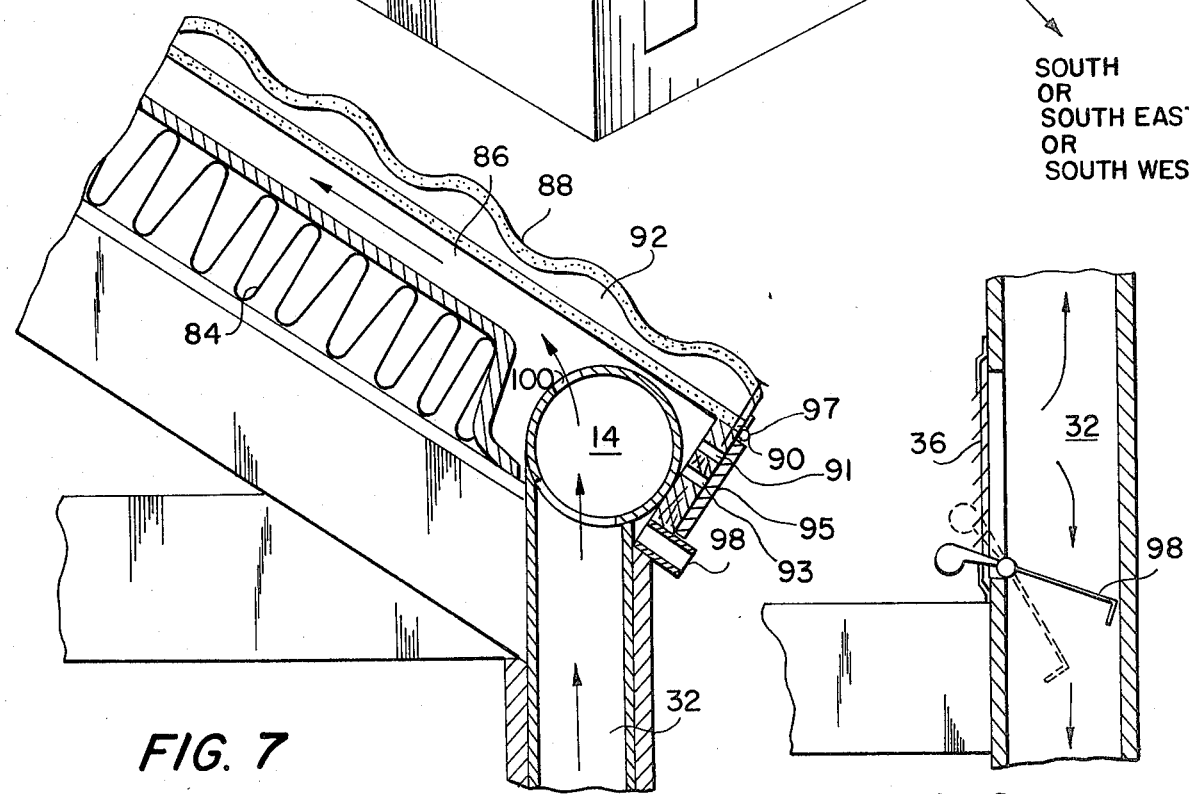
FIG. 7 is an enlarged fragmentary, section of the bottom of the heating panel, showing the transverse manifold communicating with the solar heated air plenum.

Also, as illustrated in FIG. 7, a plurality of weep holes 98 may be employed to permit flow of condensation from the plenum.

Figure 6:
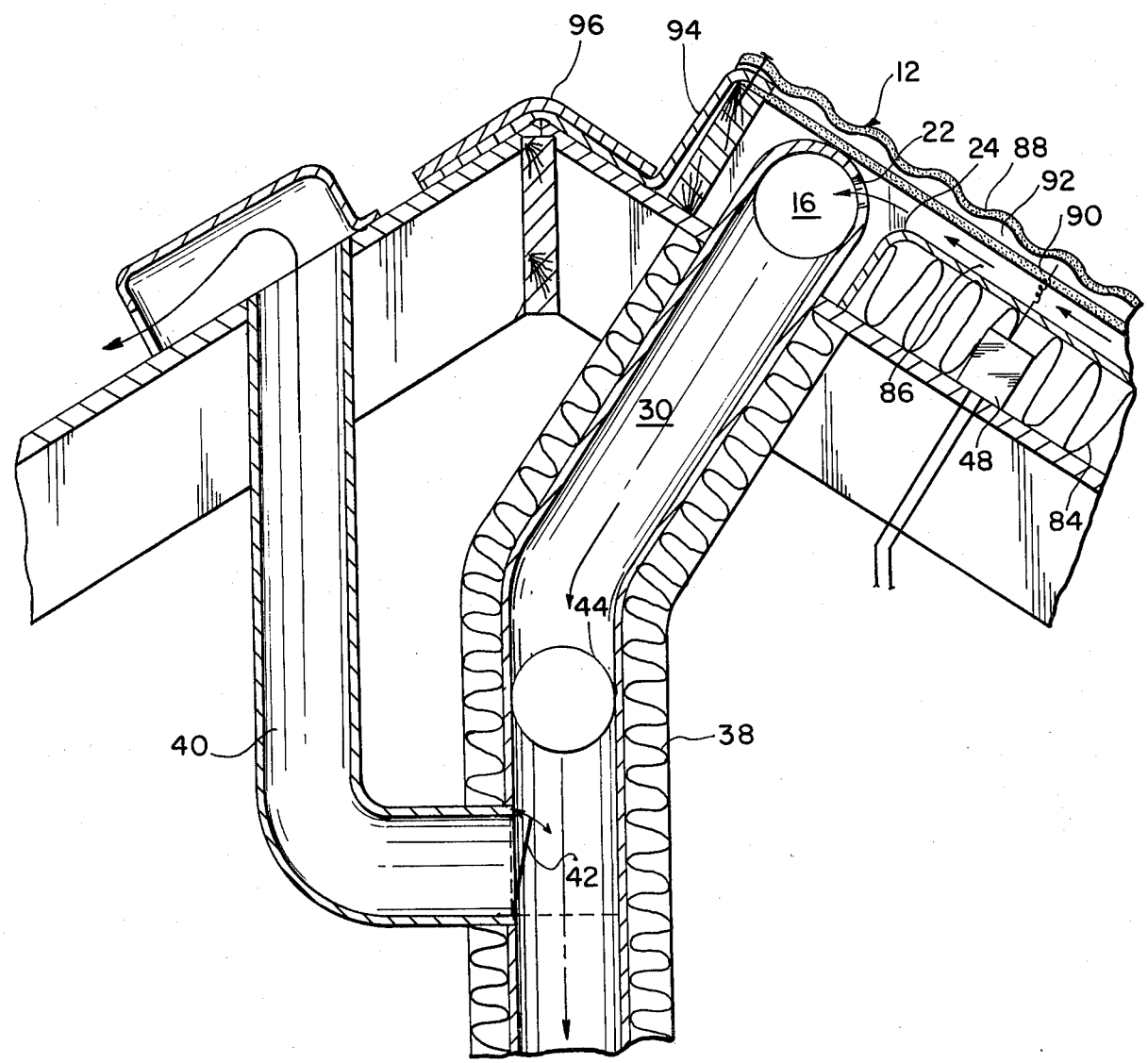
FIG. 6 is an enlarged, fragmentary section of the collector panel at the top, showing its positioning with respect to the central furnace return, and exterior venting duct 40.

As illustrated in FIG. 6 flashing 94 may extend from between the panels 88 and 90 for securement under ridge shingles 96. Conventional insulation 38 may line top central return duct 30, so as to eliminate heat loss in non-living areas, such as the attic.

As illustrated in FIG. 6, top panel 88 may be of fiberglass corrugated for strength with another transparent sheet 90 to define the plenum's upper boundary for insulation.

Figure 4:
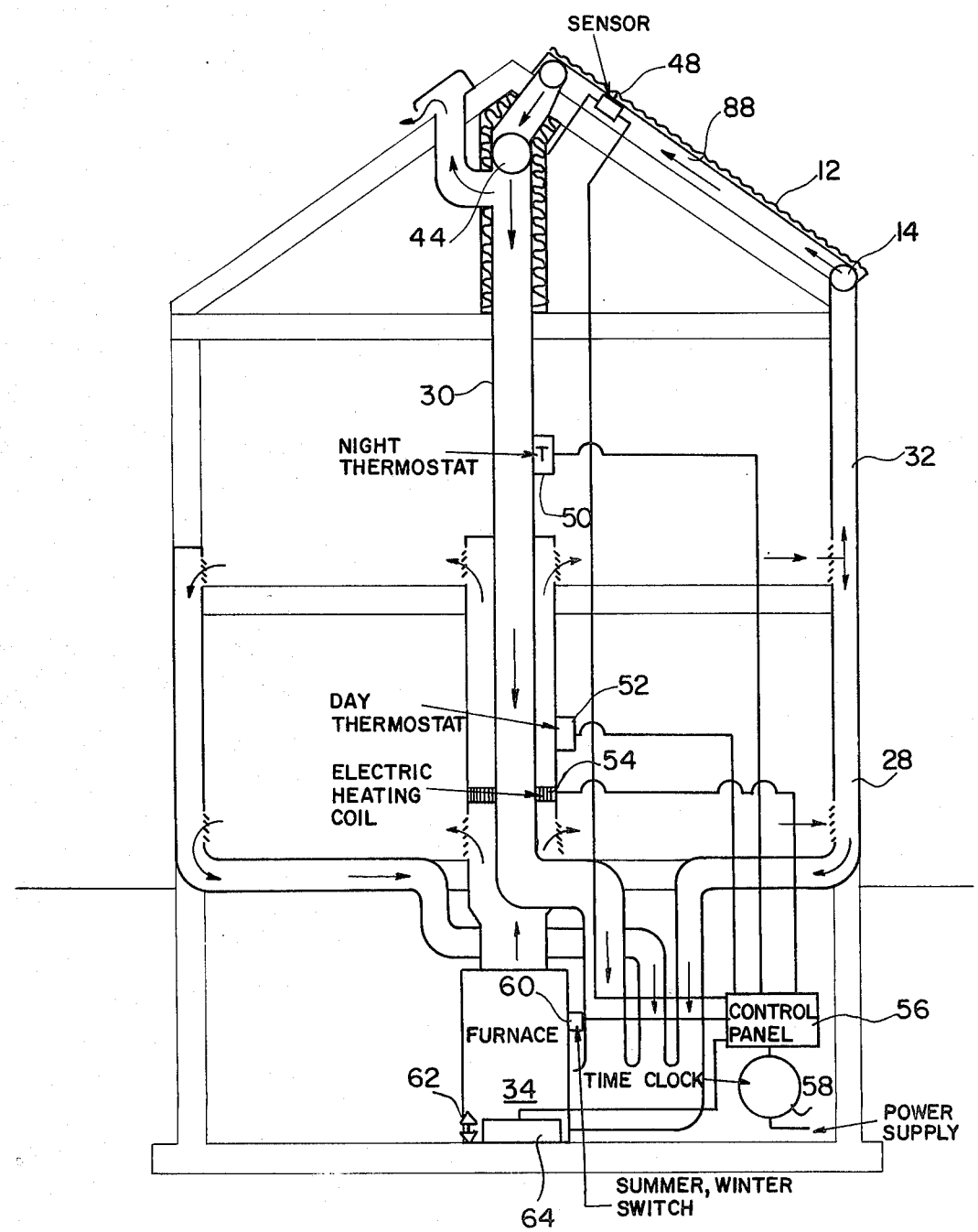
FIG. 4 is a similar transverse section, showing schematically the night and day thermostats, as well as positioning of the sensor, the electric heating elements, a time clock and controls within a household system.
Figure 5:
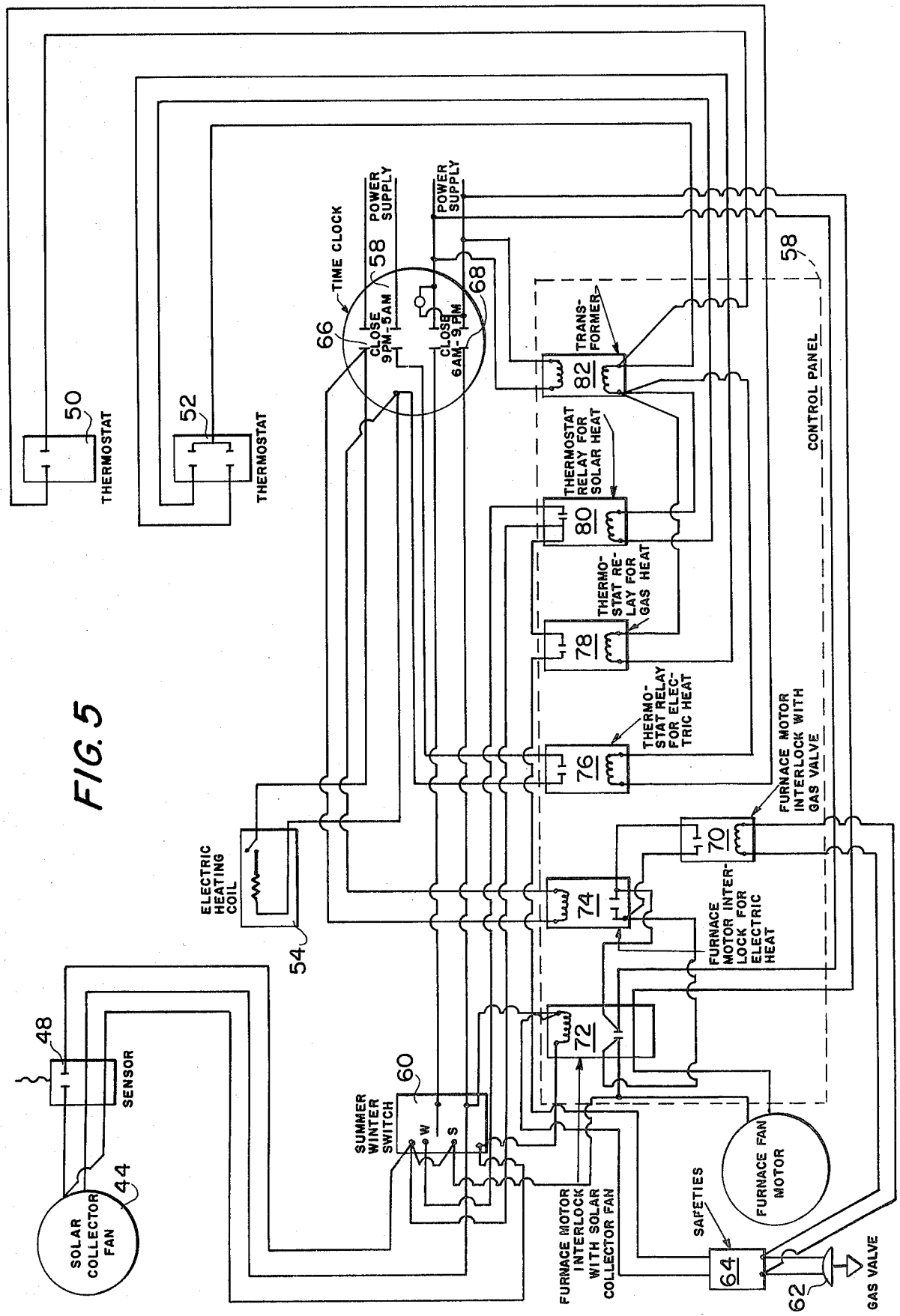
FIG. 5 is a wiring diagram, according to FIG. 4.

In FIG. 4 solar collector fan 44 is illustrated as controlled by means of temperature sensor 48 mounted within plenum 80, so as to activate fan 44, as the desired temperature is reached. Also, a night thermostat may be placed in night sleeping areas, such that the electric resistance heating elements are turned on by means of relay 76 and furnace motor interlock 74 for circulating resistance heated air through the sleeping rooms at night. A day thermostat 52 may be employed in the daytime living areas, so as to switch on for gas heat relay 78 as appropriate. A transformer 82 may be employed, as well as the respective thermostat relays for solar heat 80, electric heat 76 and gas heat 78. Also provided are furnace motor interlock with solar collector fan 72 and a furnace motor interlock 70 with gas valve 62. A suitable gas turnon valve 62 may be employed with suitable safety devices 64.

A time clock 58 may be employed, for example, with a daytime close out switch 68 activating the conventional oil fired furnace during the daylight hours of 6 a.m. to 9 p.m. and a nighttime switch 66 activating the electric heating coil 54 during the nighttime hours of 9 p.m. to 5 a.m. Also, as illustrated in FIG. 4 a summer-winter switch may be employed to activate sensor 48 and fan 44 only during the winter months, shutting them off in the summer months.

Figure 8:
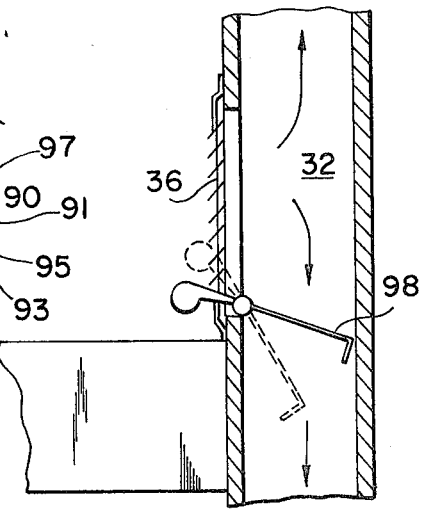
FIG. 8 is an enlarged transverse section of the furnace return, showing a pivotable damper which closes when the solar heated air is being circulated and opens when the furnace fired air is being circulated.
Figure 3:
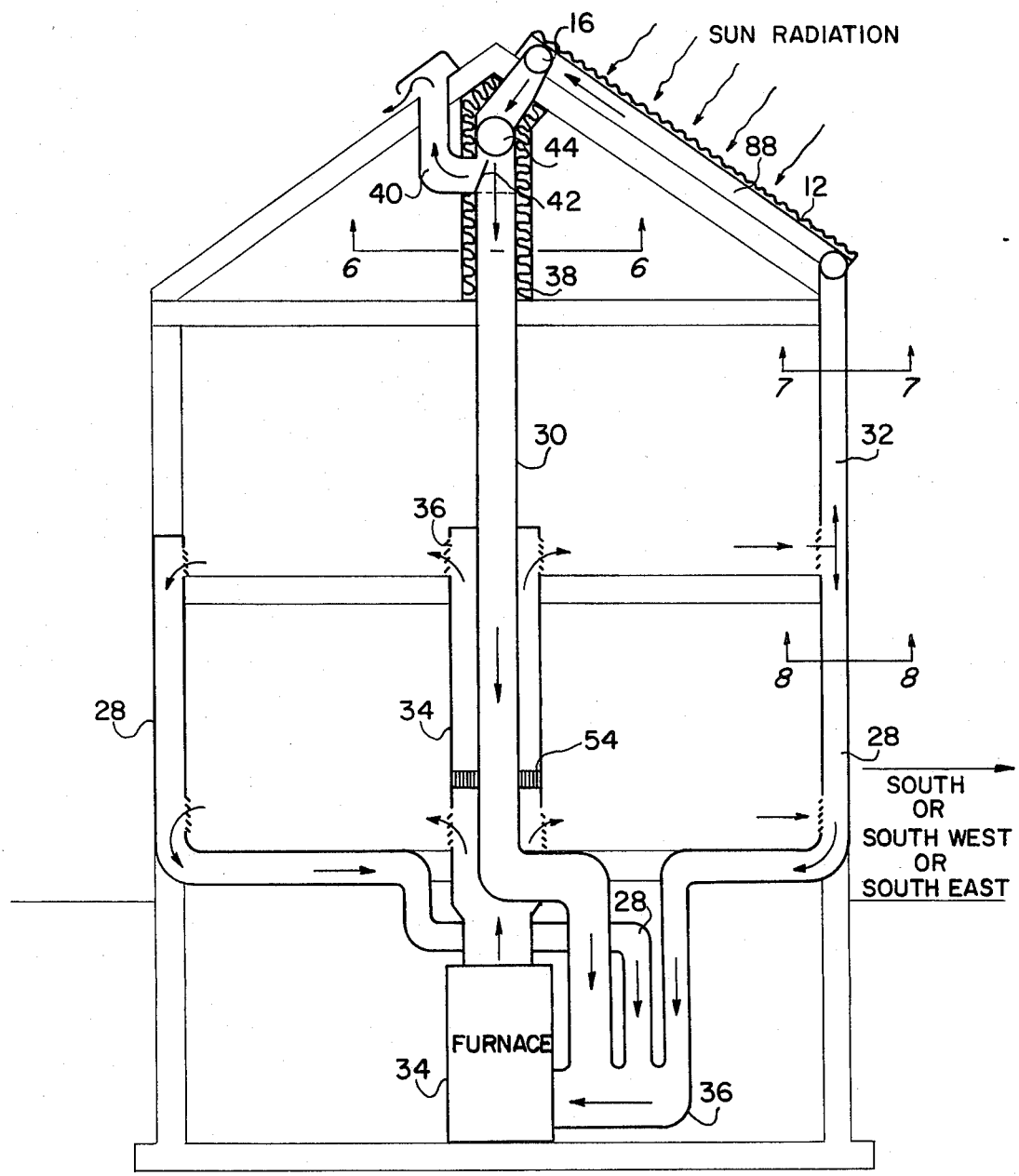
FIG. 3 is a transverse vertical section, taken through the house, showing the manifold at the top of the solar collection panel communicating directly with the furnace return.

In FIG. 8 counterweighted and pivoted damper 98 is illustrated in the closed position when solar fan 44 is being operated to circulate solar heated air. The damper position with the furnace 34 activated and the solar fan shut off is illustrated in phantom line. In such position furnace heated air is circulated upwardly through supply duct 34 and vents 36.

The present invention provides for the addition of a simple solar collecting panel in the roof while tying into existing duct work as much as possible and installing an electric resistance heater within the duct work to supplement existing gas or fuel oil fired hot air furnaces. A time clock device could limit solar usage to daylight hours and limit electric usage to night or off peak hours of electric consumption.

In daytime hours, a thermostat or sensor positioned in the solar collector would indicate whether temperatures in the collector were sufficient for heating and if so, would activate the solar collector and furnace fans. If the temperature was insufficient, conventional gas or fuel oil would be utilized to circulate furnace fired air.

At night electric resistance heated air would be ducted specifically to the sleeping areas.

As a result of adding solar and electric heating capabilities to existing gas and fuel oil furnaces, there is a reduction in gas and fuel oil consumption. The use of electric resistance heated air occurs at a time when electric utilities have excess coal or nuclear generative capacity available and when existing electric transmission facilities are presently underutilized.

Manifestly, various types of oil and gas fired furnaces as well as solar collecting panels and electric resistance heating elements could be used without departing from the spirit and scope of the invention.

I claim:
1. Method for solar heating so as to reduce oil and gas consumption in a building having a conventional fuel powered forced air heating system with supply and return ducts comprising:
   A. collecting solar energy incident to a solar collecting panel mounted upon and with an exposure utilizing a southerly portion of said building;
   B. withdrawing air heated by said incident solar energy from a plenum located beneath and in heat transfer relation to said panel;
   C. circulating during daylight hours said solar heated air as a supplement to air in said supply ducts which is heated by said conventional fuel powered forced air heating system;
   D. circulating air in said supply ducts heated only by an electric resistance element during periods of low electricity demand;
   E. directly venting said solar heated air from said plenum and exteriorly of said building during summer months; and
   F. during winter months blocking said forced air furnace heated air from circulating into said plenum, while withdrawing solar heated air from said plenum, ambient outside air being supplied to said plenum.

2. Method for solar heating so as to reduce oil and gas consumption in a building as in claim 1, including circulating of said electric resistance heated air during periods when solar heated air cannot be obtained from said plenum.

3. Method for solar heating so as to reduce oil and gas consumption in a building as in claim 2, including supplying air to said plenum from said return duct and circulating said air in said plenum traversely across said collecting panel.

4. Method of solar heating so as to reduce oil and gas consumption in a building as in claim 3, including circulating air from a bottom manifold extending transversely across the bottom of said collecting panel and recovering said air via a top manifold positioned at the top of said panel.

5. Method for solar heating so as to reduce oil and gas consumption in a building as in claim 4, wherein varying diameter apertures are employed in said manifolds so as to achieve uniform circulation across said panel.

6. Method for solar heating so as to reduce oil and gas consumption in a building as in claim 5, including primarily circulating said electric resistance heated air to sleeping areas during nighttime.

* * * * *